(12) United States Patent
Stelter et al.

(10) Patent No.: US 9,916,949 B2
(45) Date of Patent: Mar. 13, 2018

(54) ELECTRIC SWITCHING DEVICE

(71) Applicant: General Electric Technology GmbH, Baden (CH)

(72) Inventors: Achim Stelter, Kassel (DE); Klaus-Peter Magazin, Bad Wildungen (DE)

(73) Assignee: General Electric Technology GmbH, Baden Schweiz (CH)

( * ) Notice: Subject to any disclaimer, the term of this patent is extended or adjusted under 35 U.S.C. 154(b) by 0 days.

(21) Appl. No.: 15/114,927

(22) PCT Filed: Dec. 24, 2014

(86) PCT No.: PCT/EP2014/079310
§ 371 (c)(1),
(2) Date: Jul. 28, 2016

(87) PCT Pub. No.: WO2015/113717
PCT Pub. Date: Aug. 6, 2015

(65) Prior Publication Data
US 2016/0358731 A1 Dec. 8, 2016

(30) Foreign Application Priority Data

Jan. 29, 2014 (DE) .......... 10 2014 201 576

(51) Int. Cl.
*H01H 33/56* (2006.01)
*H02B 13/065* (2006.01)
*F16K 35/06* (2006.01)

(52) U.S. Cl.
CPC ....... *H01H 33/563* (2013.01); *H02B 13/0655* (2013.01); *F16K 35/06* (2013.01)

(58) Field of Classification Search
CPC .. H01H 33/48; H01H 33/563; H02B 13/0655; F16K 11/087; F16K 37/00; G01N 9/36
(Continued)

(56) References Cited

U.S. PATENT DOCUMENTS

| 6,148,851 A | 11/2000 | Friedline et al. |
| 6,263,914 B1 | 7/2001 | Meyer et al. |

(Continued)

FOREIGN PATENT DOCUMENTS

| DE | 29619328 U1 | 1/1997 |
| DE | 20113638 U1 | 1/2002 |

(Continued)

OTHER PUBLICATIONS

Translation DE29619328 (Original doc. published Jan. 2, 1997).*
International Search Report for PCT/EP2014/079310 dated Jun. 3, 2015.

*Primary Examiner* — Renee Luebke
*Assistant Examiner* — William Bolton
(74) *Attorney, Agent, or Firm* — Pearne & Gordon LLP

(57) ABSTRACT

The invention relates to an electric switching device (1), comprising at least one switching-device pole filled with insulating gas and a monitoring apparatus (14). The monitoring apparatus (14) comprises a density monitor (15) and a housing part (16), wherein a gas chamber (17) is contained in the housing part (16), which gas chamber is connected to the switching-device pole and to the density monitor (15) and can be connected to a testing device for the density monitor (15), and wherein the housing part (16) contains a shut-off element (20), which can be actuated into an open position and into a closed position. The actuation of the shut-off element (20) is independent of the connection of the gas chamber (17) to the testing device.

14 Claims, 4 Drawing Sheets

Figure 3A:
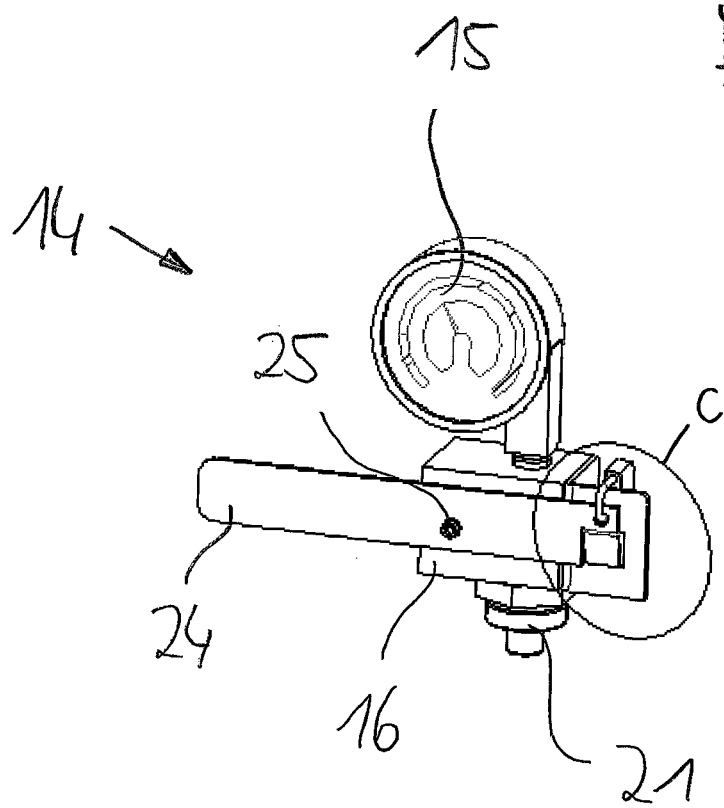

(58) Field of Classification Search
USPC .............. 218/90, 91, 97; 73/1.68; 324/424
See application file for complete search history.

(56) References Cited

U.S. PATENT DOCUMENTS

| | | | | |
|---|---|---|---|---|
| 6,651,483 | B1* | 11/2003 | Meyer | G01N 9/266 |
| | | | | 73/23.28 |
| 7,755,362 | B2* | 7/2010 | Stelter | H01H 33/56 |
| | | | | 324/424 |
| 7,937,985 | B2* | 5/2011 | Chambon | H01H 33/563 |
| | | | | 73/1.68 |
| 2008/0246487 | A1 | 10/2008 | Stelter | |
| 2012/0306656 | A1* | 12/2012 | Boucher | H01H 33/563 |
| | | | | 340/638 |
| 2013/0215548 | A1 | 8/2013 | Eastman et al. | |

FOREIGN PATENT DOCUMENTS

| | | |
|---|---|---|
| DE | 10324874 B3 | 12/2004 |
| DE | 20 2007 013841 U1 | 1/2008 |
| EP | 1632700 A1 | 3/2006 |

\* cited by examiner

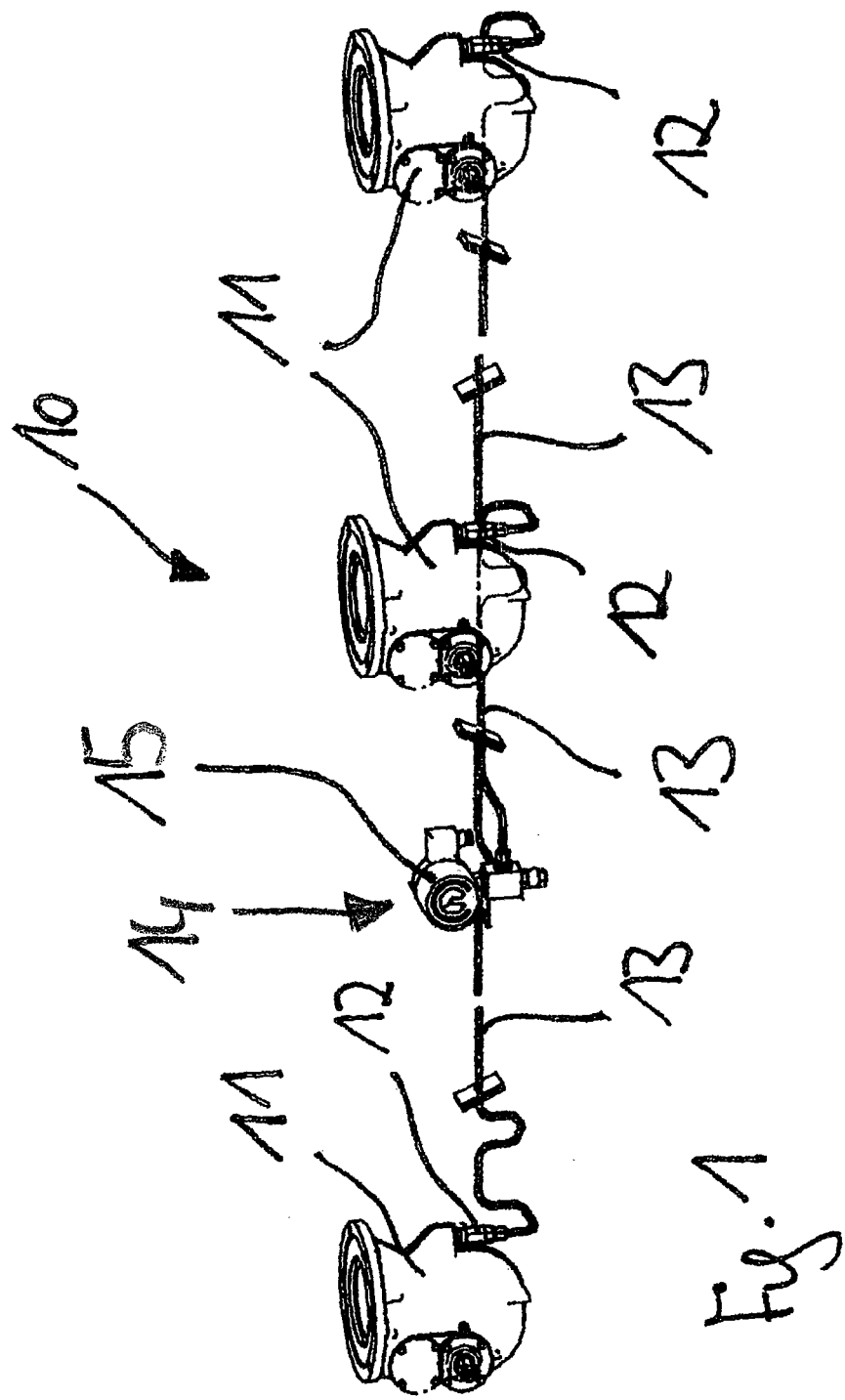

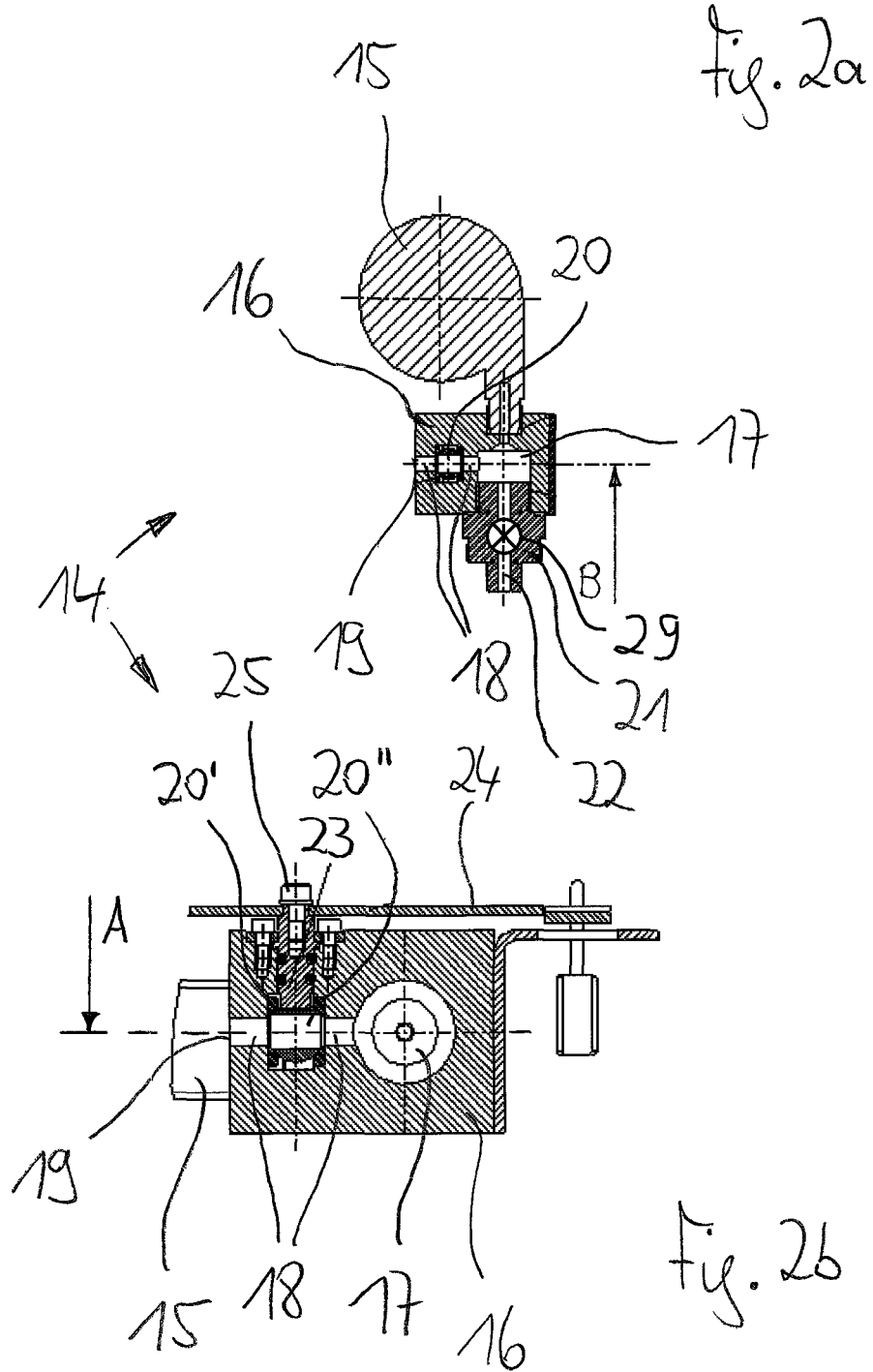

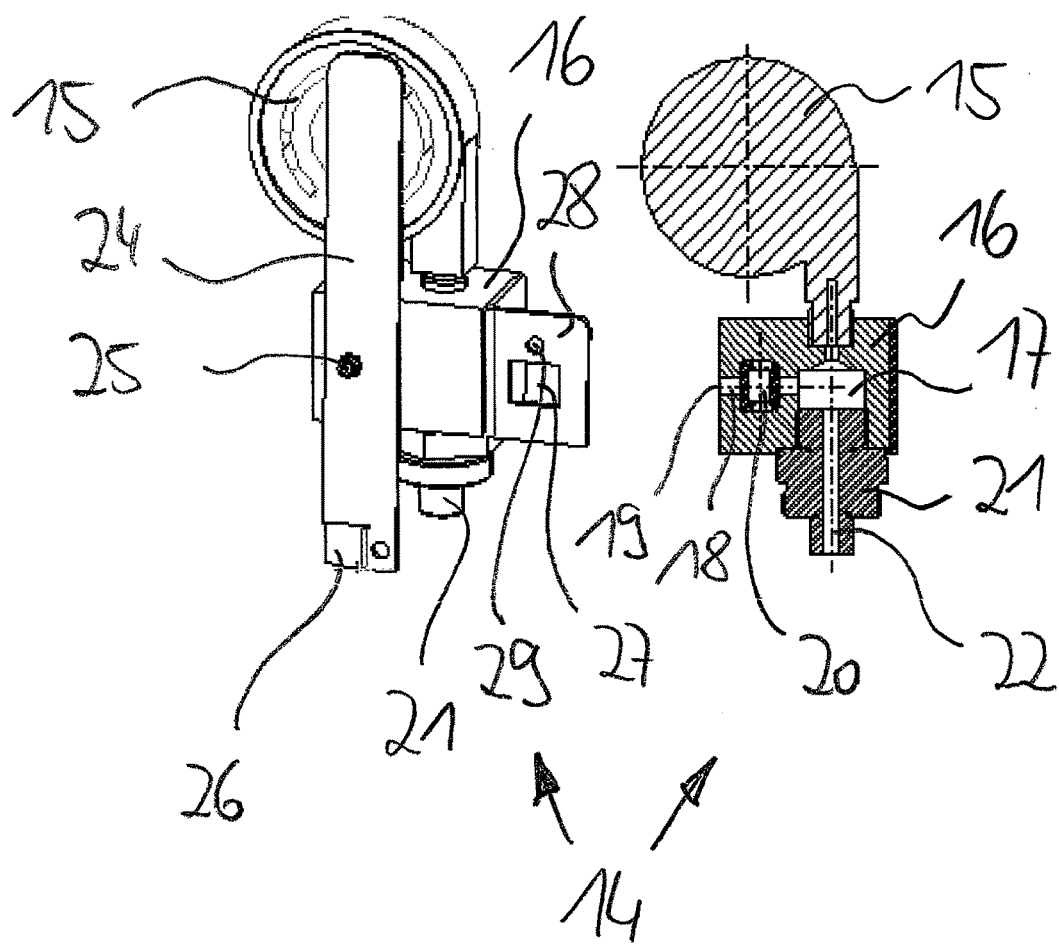

ELECTRIC SWITCHING DEVICE

CROSS-REFERENCE TO RELATED APPLICATION

This application claims the benefit of German Patent Application No. 10 2014 201 576.6 filed Jan. 29, 2014, the entire disclosure of which is incorporated herein by reference.

The invention concerns an electric switching device with at least one switching-device pole filled with insulating gas and a monitoring apparatus comprising a density monitor and a housing part, wherein a gas chamber is contained in the housing part that is connected to the switching-device pole and to the density monitor and that can be connected to a testing device for the density monitor, and wherein the housing part contains a shut-off element that can be actuated into an open position and into a closed position.

Such an electric switching device with a monitoring apparatus having a density monitor and a housing part is known from DE102007016720A1. In that case, the housing part is provided with a valve, wherein the valve can be opened and closed by screwing on and off a closing cap. When the closing cap is screwed off, a testing device can be connected with the housing part. Operating the valve is thus dependent on the connection of the testing device. As a consequence, the valve cannot be opened when the testing device for example is to remain connected over a longer period of time.

A density monitor is known for example from DE10242443B4. The density monitor is provided in this case for generating, with the aid of a pressure and temperature measurement, an electric signal at the exact moment when the density of an insulating gas to be monitored falls below or exceeds a threshold value.

The task of the invention is to improve the switching device known from DE 102007016720A1.

The invention solves this task by means of an electric switching device according to claim 1.

According to the invention, it is provided that actuating the shut-off element is independent of the connection of the gas chamber with the testing device.

Thanks to the actuation of the shut-off element being completely independent of the testing device, the shut-off element can always be switched in its opened or closed position, i.e. completely independently of whether a testing device is connected or not. In this way, the scope of use of the monitoring device is increased. For example, the testing device can remain connected over a longer period of time with the housing part and yet the shut-off element can still be opened and closed.

In a further embodiment of the invention, the housing part has a channel through which the gas chamber is connected with the switching-device pole, wherein the shut-off element is placed in the path traced by the channel. This ensures that in the closed position of the shut-off element, the gas chamber is not connected with the switching-device pole.

In a further embodiment of the invention, the shut-off element is designed to be rotatable to switch back and forth between the opened and the closed position. This can be achieved preferably in that the shut-off element has a ball valve or a plug valve or similar.

In a further embodiment of the invention, a lever is provided that is non-rotatably coupled with the shut-off element and that is provided for actuating the shut-off element. The lever allows an operator to easily actuate and switch the shut-off element.

It is particularly advantageous if the lever, when the shut-off element is in the closed position, at least partially covers a display panel of the density monitor. It can thus be made clear to the operator that the density monitor is currently not monitoring the density of the insulation gas in the switching-device pole of the switching device.

In a further embodiment of the invention, the lever is provided with a lug that can be latched in an opening connected with the housing part when the shut-off element is in the opened position. This makes it possible to prevent the lever from being inadvertently actuated when the shut-off element is in the closed position.

In a further embodiment of the invention, the lever can be closed when the shut-off element is in the opened position. This prevents an unauthorized actuation of the lever.

Further characteristics, possibilities for application and advantages of the invention will arise from the following description of embodiments of the invention, which are represented in the associated figures. All described or represented features, on their own or in any combination, constitute the object of the invention, regardless of their summary in the patent claims or of the claim dependencies as well as independently of their wording and representation in the description and in the figures.

Figure 3B:
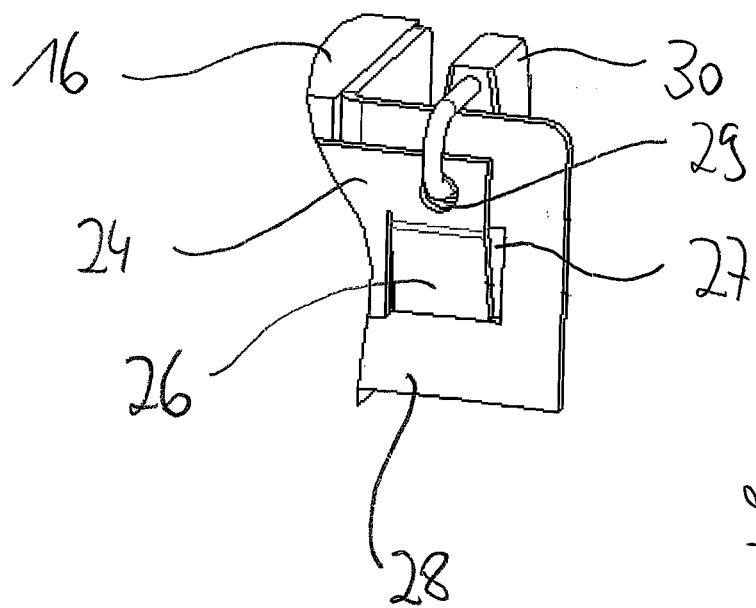

FIG. 1 shows a schematic perspective representation of a part of an electric switching device with a monitoring apparatus for an insulating gas, FIG. 2a shows a schematic cross-sectional representation of the monitoring apparatus in the plane A of FIG. 2b, FIG. 2b shows a schematic cross-sectional representation of the monitoring apparatus in the plane B of FIG. 2a, FIG. 3a shows a schematic view of the monitoring apparatus with opened shut-off element, FIG. 3b shows an enlarged schematic representation of the detail C of FIG. 3a, and FIGS. 4a and 4b show a schematic view and a schematic cross-sectional representation of the monitoring apparatus with closed shut-off element.

FIG. 1 relates by way of example to a high voltage power switch in an outdoor version with three switching-device poles and with a monitoring apparatus. It is possible for the monitoring apparatus to be associated also with the respective gas chambers of a gas-insulated medium or high voltage switching installation, such as for example a power switch gas chamber or a gas chamber for circuit breaker and/or earthing switch or a busbar gas chamber or a transducer gas chamber or similar.

FIG. 1 relates to a three-pole electric switching device 10 with which a high voltage can be switched on and off. FIG. 1 shows three crankcases 11 on whose upper side each a switching-device pole and generally speaking a switchgear pole can be mounted. Inside the crankcases 11, the driving mechanism for the respective switching-device poles is contained. The further drive shaft, with which the three crankcases 11 are connected together and with one crankcase, is not shown in FIG. 1.

All three crankcases 11 as well as the associated switching-device poles are filled with an insulating gas, for example with sulphur hexafluoride SF6. When being filled, the crankcases 11 are each provided with a feeding nozzle 12. According to FIG. 1, the three feeding nozzles 12 are connected in gas-proof manner via a pipe connection 13 with a monitoring apparatus 14. This monitoring apparatus 14 can be arranged in the area of the switching device 10, but also independently thereof.

When operating the switching-device poles, the insulating gas in the switching-device poles must have a prescribed minimum density. To monitor this minimum density, a density monitor 15 is contained in the monitoring apparatus 14. The pressure exerted on the insulating gas in the switching-device poles and the crankcases 11 is transmitted via the feeding nozzles 12 and the pipe connections 13 to the monitoring apparatus 14 and thus to the density monitor 15. The density monitor 15 in the monitoring apparatus 14 determines on the basis of this pressure whether the density of the insulation gas present in the crankcases 11 lies below the prescribed minimum density. If this is the case, the density monitor 15 triggers an alarm signal or another reaction.

The density monitor 15 is further designed in such a manner that the pressure exerted on it is displayed by means of a measuring indicator on a display panel. It is understood that this display can also be executed in a different manner.

One condition for a correct monitoring of the minimum density consists in that the density monitor 15 has no malfunction or inadmissible inaccuracy or the like. This can be checked by means of the design of the monitoring apparatus 14 explained hereinafter.

FIGS. 2a and 2b show the monitoring apparatus 14 in two cross-sectional planes. The monitoring apparatus 14 has the density monitor 15 previously mentioned. Furthermore, the monitoring apparatus 14 has a housing part 16 containing a gas chamber 17. The density monitor 15 is connected in a gas-proof manner with the housing part 16 so that the insulating gas in the gas chamber 17 is supplied to the density monitor 15 and thus the density monitor 15 can monitor the density of the insulating gas and display the pressure in the gas chamber 17 on its display panel.

A channel 18 extends in the housing part 16 from the gas chamber 17 to an opening 19. Furthermore, a shut-off element 20 is housed in the housing part 16 in the path traced by the channel 18, that can be moved back and forth between an opened position and a closed position. In the opened position, insulating gas can flow from the gas chamber 17 to the opening 19 and back, whilst the gas chamber 17 in the closed position is separated in a gas-proof manner from the opening 19. In FIGS. 2a and 2b, the opened position is shown.

The shut-off element can for example—as will be described later—be executed essentially in a manner similar to a ball valve with a central through boring. By turning the ball valve by about 90 degrees, the opened and closed position can respectively be reached. It must be pointed out that the shut-off element 20 can also be executed differently, for example in the manner of a so-called plug valve or similar.

The opening 19 of the housing part 16 is connected, in a way not represented, with the pipe connection 13 in a gas-proof manner and thus with the crankcases 11 filled with insulating gas.

The gas chamber 17 in the housing part 16 is delimited among others by a connector socket 21 having a through boring 22 in the longitudinal direction towards the outside. The connector socket 21 is connected in gas-proof manner with the housing part 16. The connector socket 21 is designed in such a way that it is possible to connect to it from outside a testing device, not represented. When such a testing device is connected with the connector socket 21, a gas connection is established from the gas chamber 17 via the through boring 22 to the testing device.

When connected, the testing device serves for testing the density monitor 15.

The connector socket 21 is furthermore designed in such a manner that—when no testing device is connected—the through boring 22 is automatically closed, so that no insulating gas can escape through the connector socket 21 from the gas chamber 17. This can be achieved for example with the aid of a self-connecting non-return valve 29, as schematically shown in FIG. 2a.

When the electric switching device 10 is operated, no testing device is normally connected to the connector socket 21 and the shut-off element 20 is its opened position. In this case, the density of the insulating gas in the crankcases 11 is measured by the density monitor 15 through the gas chamber 17, the channel 18 and the pipe connections 13 and monitored in terms of its minimum density.

For the purpose of a testing operation, a testing device is connected to the connector socket 21 and the shut-off element 20 is switched to its closed position. In this way, the gas chamber 17 is separated from the pipe connections 13. The gas chamber 17 is connected only through the connector socket 21 with the testing device. The electric switching device 10 is thus on the one hand still ready for use, on the other hand however at least temporarily no longer monitored during the testing operation in respect of the minimum density.

The previously mentioned actuation of the shut-off element 20 and the connecting of the testing device with the gas chamber 17 also previously mentioned are thus independent of one another. It is thus possible to first actuate the shut-off element 20 and then only attach the testing device to the connector socket 21 or this can also take place in reverse sequence. It is also possible for the testing device to remain connected over a longer period of time to the connector socket 21 and the switching to the testing operation mode can then be achieved by means of the single actuation of the shut-off element 20.

The aforementioned testing device can be a known testing device having normally at least the following properties. The testing device thus has a calibrated reference pressure sensor with which it is possible to measure the existing pressure via the connector socket 21. Furthermore, the testing device is designed in such a manner that insulation gas can flow from the connector socket 21 to the testing device and thus be removed from the gas chamber 17. The insulating gas is then admitted to the testing device without any insulating gas escaping. And finally, the testing device has a reserve of insulating gas that can be supplied to the connector socket 21 and thus to the gas chamber 17.

During the testing operation, the pressure in the gas chamber 17 is modified by means of the testing device. This can also be achieved by insulation gas being removed from or added to the gas chamber 17. It must be noted that due to the closed shut-off element 20, this modification of the pressure in the gas chamber 17 does not result in a modification of the pressure of the insulation gas in the crankcases 11.

The pressure existing at the feeding connector 21 is then measured by the reference pressure sensor of the testing device. This pressure in this case corresponds to the pressure of the insulation gas in the gas chamber 17. Simultaneously, the pressure in the gas chamber 17 is also measured by the density monitor 15 of the monitoring apparatus 14 and displayed on the display panel. The two measured pressures can then be compared with one another. If the pressure measured by the density monitor 15 deviates by a presettable difference value from the pressure measured by the reference pressure sensor of the testing device, this may indicate a malfunction or an inaccuracy or similar of the density monitor 15 of the monitoring apparatus 14.

The testing device thus allows the density monitor 15 of the monitoring apparatus 14 to be checked as to a malfunction or an inadmissible inaccuracy or similar.

It is then possible to switch from the testing operation mode back to the normal operation mode of the electric switching device 10 by switching the shut-off element 20 back to its opened position and removing the testing device.

As previously mentioned, the shut-off element 20 can consist for example essentially of a ball valve with a central through boring. In FIG. 2b, which shows this embodiment by way of example, the ball valve is indicated with the reference sign 20' and the through boring with the reference sign 20". The ball valve 20' can be used in the housing part 16 in a gas-proof manner for example by means of seals.

As can be seen from FIG. 2b, the ball valve 20' is coupled with a shaft 23 or similar that is oriented somewhat transversely to the direction of the through boring 20" and is coupled non-rotatably with the ball valve 20'. The shaft 23 leads out of the housing part 16 and is thus accessible from outside. The shaft 23 can for example be housed in the housing part 16 in a gas-proof manner by means of seals. Furthermore, the shaft 23 can be fastened within the housing part 16 by means of screws.

The shaft 23 can be turned around its axis. Turning the shaft 23 results in the ball valve 20' also being rotated accordingly. Due to the orientation of the through boring 20", the turning of the ball valve 20' results in the through boring 20" being either connected or not connected with the channel 18. The shaft 23 can thus move the shut-off element 20 back and forth between its opened and closed position.

Outside the housing part 16, the shaft 23 is connected non-rotatably with a lever 24. In FIG. 2b, this is achieved for example by means of a screw 25. The lever 24 can have for example the shape of an elongated bar or similar. The lever 24 can thus be pivoted together with the shaft 23 and the ball valve 20' around the axis of the shaft 23. This is tantamount to the lever 24 being pivotable back and forth and thus opening and closing the shut-off element.

FIG. 3a represents in perspective the monitoring apparatus 14. In particular, FIG. 3a shows the density monitor 15, the housing part 16, the connector socket 21, the lever 24 and the screw 25. It can furthermore be seen that the density monitor 15—as has already been mentioned—is provided with a display panel on which the currently measured pressure can be read. In FIG. 3a, the monitoring apparatus 14 is in its normal mode of operation. This means that the shut-off element is opened and the density monitor 15 monitors the density of the insulation gas in the crankcases 11.

For the purpose of visual clarification of this normal mode of operation, the lever 24 is oriented in such a manner that it is not in front of the display panel of the density monitor 15. This indicates to an operator that the pressure displayed on the display panel is "valid", i.e. that the density monitor 15 monitors the density of the insulation gas and measures and displays the pressure of the insulation gas in the crankcases. By way of example, the lever 24 in FIG. 3a is oriented horizontally.

FIG. 3b shows that the lever 24, it its roughly horizontal position, can on the one side be latched and possibly also locked. It must be noted that these measures do not imperatively have to be present and can also be present individually.

The lever 24 in FIG. 3b is thus provided with a lug 26 that can latch in an opening 27 of an elbow 28 held against the housing part 16. When the lever is pivoted in roughly the horizontal position, the lever 24 engages automatically with the opening 27. This locking can then be released again by pressing the lug 26 manually out of the opening 27. The lever 27 can then be pivoted out of its roughly horizontal position.

The locking of the lever 24 can prevent an inadvertent switching of the monitoring apparatus 14 into the testing operation mode. Instead, an operator must manually release the lock and simultaneously pivot the lever 24. This represents a so-called two-hand operation that securely prevents an unwanted actuation of the lever 24.

Furthermore, the lever 24 and the elbow 28 in FIG. 3b are each provided with a hole 29 through which a padlock 30 can extend. The lever 24 can thus be locked in its roughly horizontal position. Locking the lever 24 makes it possible to securely prevent an unauthorized actuation of the lever 24 and thus an unauthorized switching of the monitoring apparatus 14 into the testing operation mode.

FIGS. 4a and 4b show the monitoring apparatus 14 with closed shut-off element 20. In this respect, FIG. 4b corresponds—apart from the position of the shut-off element 20—essentially to FIG. 2a.

The monitoring apparatus 14 of FIGS. 4a and 4b is thus in the testing operation mode. In this case, the gas chamber 17 is separated from the crankcases 11 and the density monitor 15 does not monitor the density of the insulation gas and does not display the pressure of the insulation gas in the crankcases 11. As has been explained, the closed position of the shut-off element 20 can be achieved—starting from the opened position of FIGS. 2a, 2b, 3a, 3b—in that the shut-off element 20 is turned by approximately 90 degrees using the lever 24.

For the purpose of visual clarification of the testing operation, the lever 24 during the testing operation is oriented in such a manner that it is in front of the display panel of the density monitor 15. An operator thus has no clear view of the display panel. This indicates to an operator that the pressure displayed on the display panel is "not valid", i.e. that the density monitor 15 is not displaying the pressure of the insulation gas in the crankcases 11 and is also not monitoring the density of the insulation gas. By way of example, the lever 24 in FIG. 4a is oriented roughly vertically and is thus in front of the display panel of the density monitor 15.

FIG. 4a furthermore shows that the lug 26 of the lever 24 during the testing operation is not latched with the opening 27 of the elbow 28 and also that there is no padlock 30.

By way of complement, it must be noted that the monitoring apparatus 14 can also be executed in two or more parts. It is thus in particular possible that the density monitor 15 and the housing part 16 are not immediately connected with one another, as has been described, but that instead the density monitor 15 and the housing part 16 represent each separate components that are placed away from one another and that are then connected with one another via a gas line. It is furthermore possible for the shut-off element 20 and the gas chamber 17 not to be contained together in the housing part 16—as described—but rather for the shut-off element 20 and the gas chamber 17 to be housed in separate components that are placed away from one another and that are then connected with one another via a gas line. Finally, the described display panel can also be placed separately from the density monitor 15.

Furthermore, it must be noted that while in testing operation mode, i.e. when the shut-off element 20 is closed, it is possible to exchange the density monitor 15. Since the crankcases 11 during testing operations are separate from the gas chamber 17 and thus also from the density monitor 15, such an exchange thus not require any further measures with respect to the crankcases 11. A testing device can be present or not during such an exchange.

The invention claimed is:

1. Electric switching device (10) with at least one switching-device pole filled with insulating gas and a monitoring apparatus (14) comprising a density monitor (15) and a housing part (16), wherein a gas chamber (17) is contained in the housing part (16) that is connected to the switching-device pole and to the density monitor (15) and that can be connected to a testing device for the density monitor (15), and wherein the housing part (16) contains a shut-off element (20) that can be actuated into an opened position and into a closed position, characterized in that actuating the shut-off element (20) is independent of the connection of the gas chamber (17) with the testing device,
wherein a lever (24) is provided that is non-rotatably coupled with the shut-off element (20) and that is provided for actuating the shut-off element (20), and
wherein the lever (24), when the shut-off element (20) is in the closed position, at least partially covers a display panel of the density monitor (15).

2. Electric switching device (10) according to claim 1, wherein the housing part (16) has a channel (18) via which the gas chamber (17) is connected with the switching-device pole and wherein the shut-off element (20) is placed in a path traced by the channel (18).

3. Electric switching device (10) according to claim 1, wherein in the opened position the gas chamber (17) is connected with the switching-device pole and the density monitor (15) whilst in the closed position the gas chamber (17) is not connected with the switching-device pole.

4. Electric switching device (10) according to claim 3, wherein the gas chamber (17) in the closed position is connected with the density monitor (15).

5. Electric switching device (10) according to claim 3, wherein the gas chamber (17) in the closed position is connected with the density monitor (15) and with a connected testing device.

6. Electric switching device (10) according to claim 1, wherein a connector socket (21) is provided for the testing device, wherein the connector socket (21) is connected with the housing part (16) and at least partially delimits the gas chamber (17), and wherein the connector socket (21) contains a through boring (22) via which the gas chamber (17) can be connected with the testing device.

7. Electric switching device (10) according to claim 6, wherein the connector socket (21) is designed in such a manner that—when no testing device is connected—the through boring (22) is automatically closed.

8. Electric switching device (10) according to claim 1, wherein the shut-off element (20) is designed to be rotatable to switch back and forth between the opened and the closed position.

9. Electric switching device (10) according to claim 8, wherein the shut-off element (20) has a ball valve (20') or a plug valve.

10. Electric switching device (10) according to claim 8, wherein the shut-off element (20) can be actuated via a shaft (23) leading out of the housing part (16).

11. Electric switching device (10) according to claim 1, wherein the lever (24) is provided with a lug (26) that can be latched in an opening (27) connected with the housing part (16) when the shut-off element (20) is in the opened position.

12. Electric switching device (10) according to claim 1, wherein the lever (24) can be closed when the shut-off element (20) is in the opened position.

13. Electric switching device (10) according to claim 1, wherein in the closed position of the shut-off element (20) and with a connected testing device, the density monitor (15) can be checked as to a malfunction or an inadmissible inaccuracy.

14. Electric switching device (10) with at least one switching-device pole filled with insulating gas and a monitoring apparatus (14) comprising a density monitor (15) and a housing part (16), wherein a gas chamber (17) is contained in the housing part (16) that is connected to the switching-device pole and to the density monitor (15) and that can be connected to a testing device for the density monitor (15), and wherein the housing part (16) contains a shut-off element (20) that can be actuated into an opened position and into a closed position, characterized in that actuating the shut-off element (20) is independent of the connection of the gas chamber (17) with the testing device,
wherein the density monitor (15) is provided with a display panel on which a currently measured pressure can be read,
wherein a lever (24) is provided that is non-rotatably coupled with the shut-off element (20) and that is provided for actuating the shut-off element (20), and
wherein the lever (24), when the shut-off element (20) is in the closed position, at least partially covers the display panel of the density monitor (15).

* * * * *